United States Patent [19]

Allinson et al.

[11] 4,184,953

[45] Jan. 22, 1980

[54] PHYSICAL PROCESS

[75] Inventors: David J. S. Allinson, East End, near Newbury, England; Robert W. Mitchell, Inverurie, Scotland

[73] Assignee: The British Petroleum Company Limited, London, England

[21] Appl. No.: 888,531

[22] Filed: Mar. 21, 1978

[30] Foreign Application Priority Data

Mar. 22, 1977 [GB] United Kingdom ............... 11957/77
May 5, 1977 [GB] United Kingdom ............... 18855/77

[51] Int. Cl.² ........................................... B01D 29/08
[52] U.S. Cl. .................................. 210/82; 210/500 R
[58] Field of Search ............. 210/82, 500 R, 503–505, 210/508, 509

[56] References Cited

U.S. PATENT DOCUMENTS

| 2,165,772 | 7/1939 | Walsh et al. ................. 210/500 R X |
| 3,142,612 | 7/1964 | Reiman ................................. 210/509 |
| 4,025,438 | 5/1977 | Gelman ............................ 210/503 X |
| 4,041,560 | 8/1977 | Jacobsen ........................... 210/82 X |
| 4,070,287 | 1/1978 | Wiegand et al. ............ 210/DIG. 26 |

Primary Examiner—William A. Cuchlinski, Jr.
Attorney, Agent, or Firm—Morgan, Finnegan, Pine, Foley & Lee

[57] ABSTRACT

Sea water for injection into an oil field to maintain the pressure thereof is filtered through a filter element composed of polyester fibres. The diameter of the fibres is from 8 to 15 microns, the thickness of the element at least 7 mms and the density in the range 0.08 to 0.1 gm/cc.

7 Claims, No Drawings

PHYSICAL PROCESS

The present invention relates to a method for the filtration of the sea water prior to its injection into an oil reservoir and also to a filter element for use in the method.

To assist in the recovery of oil it has been the practice to inject water under pressure into the reservoir rock via injection wells to drive the oil through the rock into near-by producing wells.

When the oil reservoir is located under the sea, the most readily available water for injection is the sea water itself.

However, sea water often contains particulate matter, for example sand and marine organisms and it has previously been proposed to filter sea water prior to injection to reduce the risk of the particulate matter blocking the pores in the reservoir. For this purpose sand filters and diatomaceous earth filters have been proposed but are often unsuitable on account of their size and weight for use on offshore platforms where space and weight are at a premium.

There is accordingly a need for a filter that is smaller and lighter than the sand or diatomaceous earth filters proposed hitherto but which can nevertheless deal with the high volumes of water required for injection.

According to the present invention a filter element suitable for filtering sea water for injection into an oil reservoir comprises a fabric of polyester fibres, the diameter of the fibres being in the range 8 to 15 microns and the thickness of the element being from 7 to 20 mm.

The sea water prior to filtration may contain fine particles of inorganic material such as sand and may also contain a proteinaceous and lipidic waxy dispersion resulting from the shearing action caused by pumps and the like on marine organisms in the sea water.

The filter element according to the invention can treat sea water containing up to 1.0 mg/liter of particles of size 1 to 80 microns to remove at least 50% of particles in the 1–2 microns range and at least 60% of particles above 2 microns in size.

References to the thickness of the element in the specification mean the uncompressed thickness of the element before being used for filtration.

Preferably the filter element consists substantially of polyester fibres.

Preferably the thickness of the element is in the range 8 to 15 mm.

Preferably the density of the element is in the range 0.080 to 0.100 gm/cc. The density refers to the bulk density of the element and is determined by weighing the element in air to determine its weight per unit area in gms/cm$^2$ and then measuring and dividing by the thickness to obtain the density in gms/cc.

The filter element can conveniently be in the form of an annulus, in which case the thickness referred to above is measured in a radial direction.

The filter element can be woven or non-woven polyester fabric which is sometimes called a felt by those skilled in the art. The element can be made by the well known needle punch process. The needle punch process can use fibres about 2–4 inches in length and employ 200–300 punches per sq. inch on a polyester scrim of loose weave. The scrim and the needle punch technique used can be, for example, any of those described in UK Pat. No. 1,229,781. The term loose weave would be well understood by those skilled in the art.

The polyester can be derived from one of the phthalic acids, for example, polyethylene terephthalate, though a wide range of other synthetic fibre forming polyesters can be employed.

According to another aspect of the present invention a method of filtering sea water comprises passing the sea water through a filter element comprising polyester fibres as hereinbefore described.

Conveniently the flow of water through the element is in the range 25 to 50 US gallons/sq. ft./minute.

The element can be cleaned by backwashing periodically. In the case of an element in the form of an annulus the cleaning can be effected by reversing the flow through a sector of the element whilst maintaining the filtration in the opposite direction through another sector which can be the remainder of the element.

EXAMPLE 1

A needle punched felt filter element was prepared from polyethylene terephthalates fibres by placing layers of fibre obtained from a conventional carding machine onto a polyester scrim of loose weave and needle punching at 250 punches per sq. inch. The fibres were 3 inches in length.

The properties of the element were as follows:

| | |
|---|---|
| Thickness | 9.5 mm(uncompressed) |
| Density | 0.089 gms/cc |
| Diameter of fibers | 12.4 microns (1.5 denier) |

The element was in the form of an annulus of inner diameter about 15 inches, thickness in a radial direction of 9.5 mm uncompressed (as specified above) and length in an axial direction of 48 inches.

The filter element described above has the following advantages:

(i) it is capable of being cleaned by backwashing.
(ii) as compared with a sand or diatomaceous earth filter it is much less heavy and occupies less space, and
(iii) the element has a long life but when it has deteriorated it can readily be removed from its holder and replaced.

EXAMPLE 2

Use of the filter element prepared as described in Example 1 to filter sea water. The element was installed in a stainless steel holder and sea water withdrawn from the North Sea at a depth of 200 feet and which had been treated by:

(1) injection of hypochlorite giving a chlorine residual in the range of 0.1–0.4 ppm,
(2) filtration through a stainless steel mesh to remove particles of size greater than 80$\mu$,
(3) deoxygenation by mechanical and/or chemical means,
(4) occasional addition of an organic biocide, and which contained from 0.2 to 0.4 mg/liter of particles of size 1 to 80 microns as determined by the standard millipore technique was passed to the inside of the filter annulus. A maximum pressure differential of 2–5 psi was maintained across the element. The water flowed radially outward through the filter element at the rate of 550 US gallons/minute. The filtrate was examined and was found to have had 70% of the particles in the 1–2$\mu$ range removed and 75–85% of particles above 2$\mu$ in size removed by the filtration. The percentage removal of total solids was 60%.

After 15 minutes filtration the filter element was cleaned by backwashing a segment of about 3°–4° of arc by supply water at a pressure of 40–90 psi (which was the pressure of the system) so that it flowed radially inward through the segment at a rate of 4–8 gallons per linear inch per minute whilst maintaining the filtration in the opposite direction through the rest of the element. The backwashing was continued for 1 minute. The outlet was in the form of a rotating arm which was rotated at 2 rpm. The total time during which backwashing was effected was 1 minute for each filter element.

The filtered water was injected via an injection well into an oil reservoir to maintain pressure and drive the oil towards production wells.

Examples 3, 4, and 5 are not examples of the invention and are included for comparative purposes only.

EXAMPLE 3

Thickness of filter element not according to the invention.

The filter element was exactly as described in Example 1 with the exception that

| Thickness | 2.8 mm |
|---|---|
| Density | 0.099 gms/cc |

The diameter of the fibres was the same as Example 1 i.e. 12.4 microns.

The element was employed as described in Example 2 to filter sea water. It was found that initially 60% of particles greater than 2 microns were removed (compared with 75–85% in Example 2) and this deteriorated to 20% removal after 24 hours. Over this period the average removal of all solids (as determined by the Millipore technique) was 30%.

EXAMPLE 4

Density and thickness of filter element not according to the invention.

A polyester filter element prepared as described in Example 1 with the exception that the thickness was 2.3 mm, the density was 0.29 gms/cc and the fibre diameter 15 microns and was employed as described in Example 2. It was found that from 40 to 60% of particles greater than 2 microns were removed (compared with 75–85% in example 2)

EXAMPLE 5

Fibre diameter not according to the invention.

A polyester filter element was prepared as described in Example 1 with the exception that

| Thickness | 8 mm |
|---|---|
| Density | 0.097 gms/cc |
| Fibre diameter | 41 microns |

The element was employed as described in Example 2 and it was found that 60% of all particles greater than 2 microns were removed (compared with 75–85% in Example 2) over a 24 hour test period the % removal of total solids as measured by the millipore technique was 45% (compared with 60% in Example 2).

We claim:

1. A filter element suitable for filtering sea water for injection into an oil reservoir, the filter element consisting substantially of polyester fibers in the form of a fabric, the diameter of the fibers being in the range 8 to 15 microns, the thickness of the element being from 7 to 20 mm. and wherein the density of the element is in the range 0.080 to 0.100 gm/cc.

2. A filter element as claimed in claim 1 wherein the thickness of the element is in the range 8 to 15 mm.

3. A filter element as claimed in claim 1 wherein the element is a woven or non-woven fabric made by the needle punch process.

4. A method of filtering sea water which method comprises passing the sea water containing up to 1.0 mg/liter of particles of size 1 to 80 microns through a filter element as claimed in claim 1 to remove at least 50% of particles in the 1–2 microns range and at least 60% of particles above 2 microns in size.

5. A method as claimed in claim 4 wherein the element is in the form of an annulus and the flow of sea water is radially through the annulus and the element is cleaned by backwashing involving reversing the flow through a sector of the element whilst maintaining the flow to effect filtration through another sector of the element.

6. A method as claimed in claim 5 which method includes a prior step of removing substantially all particles of greater than 80 microns before filtering.

7. A filter element suitable for filtering sea water for injection into an oil reservoir, the filter element consisting substantially of polyester fibers in the form of a fabric, the diamter of the fibers being in the range 8 to 15 microns, the thickness of the element being from 7 to 20 mm. and wherein the density of the element is in the range 0.080 to 0.100 gm/cc, the filter element having been made by a needle punch process using polyester fibers from about 2 to 4 inches in length and employing 200 to 300 punches per square inch on a polyester serim.

* * * * *